United States Patent [19]

Monsod, Jr.

[11] 4,069,350
[45] Jan. 17, 1978

[54] ANIMAL FEED COMPOSITION FROM WATER HYACINTH PLANT

[76] Inventor: Godofredo G. Monsod, Jr., 11 Scout Bayoran Street, Quezon City, Philippines

[21] Appl. No.: 704,953

[22] Filed: July 13, 1976

[51] Int. Cl.² .............................................. A23K 1/00
[52] U.S. Cl. .................................. 426/635; 426/656; 426/807
[58] Field of Search ............... 426/106, 285, 635, 636, 426/807, 518, 519, 479, 482, 656, 658

[56] References Cited

U.S. PATENT DOCUMENTS 3,657,423   4/1972   Yacowitz ............................ 426/807

OTHER PUBLICATIONS

Hag et al, "Carbohydrate Constituents of the Roots of Water Hyacinth", cited in Chemical Abstracts 82:28526t.

Datta et al, "Preparation of Protein Concentrates from Leaves of Water Hyacinth", cited in Chemical Abstracts 65:17356g.

Ramachandran et al "Eradiestion and Utilization of Water Hyacinth", cited in Chemical Abstracts 75:106006v.

Morrison "Feeds and Feeding", Morrison Publishing Co., 1957, pp. 697, 847-848, 932-934, 1118 and 1124.

*Primary Examiner*—R. B. Penland
*Attorney, Agent, or Firm*—Shapiro and Shapiro

[57] ABSTRACT

An animal feed composition of high protein content and low fiber content is produced by mixing essential amounts of water hyacinth meal (leaves and roots) and hyacinth leaf protein concentrate with minor amounts of corn meal, fish meal, bone meal, molasses, shell and salt.

11 Claims, No Drawings

ANIMAL FEED COMPOSITION FROM WATER HYACINTH PLANT

This invention relates generally to animal feeds. More particularly, it relates to a method of producing a novel animal feed composition which utilizes water hyacinth meal (leaves and roots) and water hyacinth leaf protein concentrate as its principal ingredients.

The prices of the existing animal feeds commonly sold in the market are constantly increasing that it is imperative to find some ways and means to reduce its cost. Preferably, said animal feeds should be manufactured from components regarded as waste products which may not be fit for human consumption.

Water hyacinth, Eichhornia Crassipes, (Mart), Solmes, is an aquatic herb of the pickarel weed family, Pontederiaceae, which naturally abounds in tropical America and other warm regions. Its abundance in waterways becomes a nuisance, impeding water navigation in said areas as well as prejudicing aquatic life. Its eradication entails cnsiderable expenditures of labor and money resulting in temporary relief only.

Water hyacinth is a good potential source of protein and other nutrients; hence, it will be utilized as the major part of animal feed composition. The leaves and roots of the water hyacinth, as analyzed by the Bureau of Animal Industry of the Republic of the Philippines, have protein contents of 18.7% and 11.8%, respectively, and fiber contents of 17.1% and 7.9%, respectively. On the other hand, the hyacinth leaf protein concentrate, as per analysis of the Food and Nutrition Research Institute, Republic of the Philippines, contains the following nutrients per 100 mg of sample: 36,641 mg. carotene, 0.32 mg. thiamine, 1.14 mg. riboflavin and 4.7 mg. niacin.

Corn, which is rich in starch and highly digestible, is one important source of bone building mineral nutrients. This is added to the present animal feed composition to supply the needed carbohydrates and sugar. Fish meal and bone meal, which are commercially available, are typical animal protein feeds and so are also utilized in the present invention.

It is the primary object of this invention to provide for a novel feed for poultry, swine, cattle, buffalo, carabao and horses which comprises all the essential substances for animal nutrients.

It is another object of this invention to utilize water hyacinth meal (leaves and roots) and water hyacinth leaf protein concentrate as the main ingredients in the formulation of the animal feed.

It is a further object of this invention to provide an animal feed with high protein content and low fiber content through the addition of the water hyacinth leaf protein concentrate.

Still another object of this invention is to provide an animal feed product which is of low cost and produced in an inexpensive process of manufacture.

A further object of this invention is to provide an animal feed in pellet form.

Other objects and advantages inherent in this invention will become apparent upon reading the detailed description as hereinafter described.

In accordance with the present invention, this animal feed composition is prepared by gathering the water hyacinth plants and washing them with water to remove all adhering impurties. The leaves and roots are separated from the stems and are dried under the sun or in an oven at a temperature not exceeding 120° C. The dried leaves and roots are then ground and made to pass through a screen, preferably through a classifier vibration screen (80–100) mesh, to produce the water hyacinth meal.

The resulting hyacinth meal is then mixed with the commercially available corn meal, fish meal, bone meal, shell, salt and soybean oil meal particularly for cattle, buffalo, carabao, horses and turkey starter. Extracted hyacinth leaf protein concentrate and dehydrated stolons are also added to increase further the protein content of the feed. The prepared hyacinth meal and its addition are mixed in the following proportions expressed in percent by weight:

For Poultry:

| | |
|---|---|
| Water Hyacinth meal (leaves and roots) | 32–48% |
| Hyacinth leaf protein concentrate | 5–13% |
| Corn Meal | 12.0–36.5% |
| Soybean Oil Meal (for Turkey Starter) | 18–22% |
| Fish Meal | 10–17% |
| Molasses | 3.5% |
| Bone Meal | 1.0% |
| Shell | 0.5%–2.5% |
| Salt | 0.5% |

For Swine:

| | |
|---|---|
| Water hyacinth meal (leaves and roots) | 27–56% |
| Hyacinth leaf protein concentrate | 14–18% |
| Corn Meal | 30–40% |
| Fish Meal | 5–18% |
| Molasses | 2.0% |
| Shell | 1.5% |
| Salt | 0.5% |
| Zinc Carbonate | 0.1% |

For cattle, buffalo, carabao and horse:

| | |
|---|---|
| Water hyacinth meal | 20–43% |
| Water hyacinth dehydrated stolon | 10% |
| Corn Meal | 23–25% |
| Shell | 2.5% |
| Salt | 0.5% |
| Molasses | 2.0% |
| Soybean oil meal | 15–25% |
| Wheat middling | 10–15% |

The mixture is then fed to a pellet mill and the resulting animal feed pellets are packed for distribution.

The following are the feed formula examples together with the respective analysis of the feed composition. These feed formula examples are typical embodiments of the invention in the production of the animal feed.

| | Analysis of Feed Composition Animal Nutrition Laboratory Bureau of Animal Industry (Republic of the Phillipines) | | | | | | | |
|---|---|---|---|---|---|---|---|---|
| Ingredients | Protein | Fat | Fiber | Moisture | Ash | NFE | Calcium | Phosphorus |
| Water Hyacinth Roots | 11.8 | 0.5 | 7.9 | 11.2 | 27.0 | 41.6 | 1.03 | 0.67 |
| Water Hyacinth Leaves | 18.7 | 3.2 | 17.1 | 11.3 | 13.6 | 36.1 | 2.07 | 0.54 |

-continued

| Ingredients | Analysis of Feed Composition Animal Nutrition Laboratory Bureau of Animal Industry (Republic of the Phillipines) | | | | | | | |
|---|---|---|---|---|---|---|---|---|
| | Protein | Fat | Fiber | Moisture | Ash | NFE | Calcium | Phosphorus |
| *HLPC | 23.2 | 5.0 | 4.3 | 8.6 | 21.5 | 40.0 | 1.86 | 0.61 |
| Fish Meal | 62.2 | 8.5 | 0.7 | — | 11.5 | 4.2 | 5.0 | 0.3 |
| Corn | 8.9 | 3.9 | 2 | — | 1.3 | 70.9 | .02 | 0.3 |
| Shell | — | — | — | — | — | — | 31.0 | — |
| Table Salt | — | — | — | — | — | — | — | — |
| Dehydrated Stolon | 6.9 | 1.0 | 12.5 | 8.6 | 7.0 | 67.5 | — | — |
| Soybean Oil Meal | 44.2 | 5.3 | 5.1 | — | 5.8 | 29.3 | 0.30 | 0.70 |

*Hyacinth Leaf Protein Concentrate

| | POULTRY FEED FORMULAE H. R. D. C. - Foreign | | | |
|---|---|---|---|---|
| Feedstuffs | Broiler Pellets or Mash % | Chick Starter Pellets or Mash % | Chicken Grower or Mash % | Chicken Layer Pellets or Mash % |
| Water Hyacinth (Roots and Leaves) | 32 | 32.5 | 32 | 30 |
| *H L P C | 13 | 13 | 13 | 13 |
| Ground Yellow Corn | 32.5 | 35 | 36 | 36.5 |
| Fish Meal | 17 | 14 | 13 | 13 |
| Salt | 0.5 | 0.5 | 0.5 | 0.5 |
| Bone Meal | 1.0 | 1.0 | 1.0 | 1.0 |
| Shell | 0.5 | 0.5 | 1.0 | 2.5 |
| Molasses | 3.5 | 3.5 | 3.5 | 3.5 |
| TOTAL | 100.0 | 100.0 | 100.0 | 100.0 |
| CALCULATED ANALYSIS (Total Percentage Value for each Feedstuff per Formula) | | | | |
| Protein | 21.56 | 20.42 | 19.81 | 19.63 |
| Fat | 4.05 | 4.05 | 4.00 | 4.02 |
| Fiber | 5.81 | 5.88 | 6.20 | 6.06 |
| Moisture | 4.73 | 4.68 | 4.62 | 4.40 |
| STANDARD VALUE (Bureau of Animal Industry) | | | | |
| Protein | NLT | 21.0 | 19.0 | 16.0 | 18.0 |
| Fat | NLT | 4.0 | 4.0 | 4.0 | 4.0 |
| Fiber | NMT | 8.0 | 8.0 | 10.0 | 10.0 |
| Moisture | NMT | 13.0 | 13.0 | 13.0 | 13.0 |

*Hyacinth Leaf Protein Concentrate

| POULTRY FEED FORMULAE H. R. D. C. - Foreign Calculated Analysis for Each Feedstuff per Formula (Reference Value) | | | | | | | | | |
|---|---|---|---|---|---|---|---|---|---|
| Broiler PELLETS or MASH | | | | | | | | | |
| FEEDSTUFF | Protein | Fat | Fiber | Moisture | Ash | NFE | Calcium | hos. | % Comp. |
| Water Hyacinth Leaves | 3.55 | 0.61 | 3.25 | 2.15 | 2.58 | 6.95 | 0.39 | 0.10 | 19 |
| Water Hyacinth Roots | 1.53 | 0.07 | 1.23 | 1.46 | 3.51 | 5.41 | 0.13 | 0.09 | 13 |
| *H L P C | 3.02 | 0.65 | 0.56 | 1.12 | 2.80 | 5.20 | 0.24 | 0.08 | 13 |
| Ground Yellow Corn | 2.89 | 1.27 | 0.65 | — | 0.42 | 23.04 | 0.01 | 0.10 | 32.5 |
| Fish Meal | 10.57 | 1.45 | 0.12 | — | 1.96 | 0.71 | 0.85 | 0.58 | 17 |
| TOTAL | 21.56 | 4.05 | 5.81 | 4.73 | 11.27 | 41.31 | 1.62 | 0.95 | 94.5 |
| STARTER PELLETS or MASH | | | | | | | | | |
| Water Hyacinth Leaves | 4.68 | 0.80 | 4.28 | 2.83 | 3.40 | 9.15 | 0.52 | 0.14 | 25 |
| Water Hyacinth Roots | 0.89 | 0.04 | 0.59 | 0.84 | 2.03 | 3.12 | 0.08 | 0.05 | 7.5 |
| *H L P C | 3.02 | 0.65 | 0.56 | 1.01 | 2.80 | 5.20 | 0.24 | 0.08 | 13 |
| Ground Yellow Corn | 3.12 | 1.37 | 0.35 | — | 0.46 | 24.82 | 0.01 | 0.12 | 35 |
| Fish Meal | 8.71 | 1.19 | 0.10 | — | 1.61 | 0.59 | 0.70 | 0.48 | 14 |
| TOTAL | 20.42 | 4.05 | 5.88 | 4.68 | 10.30 | 42.88 | 1.55 | 0.87 | 94.5 |
| GROWER PELLETS or MASH | | | | | | | | | |
| Water Hyacinth Leaves | 4.68 | 0.80 | 4.28 | 2.83 | 3.40 | 9.15 | 0.52 | 0.14 | 25 |
| Water Hyacinth Roots | 0.82 | 0.04 | 0.55 | 0.78 | 1.89 | 2.91 | 0.07 | 0.05 | 7 |
| *HLPC | 3.02 | 0.65 | 0.56 | 1.01 | 2.80 | 5.20 | 0.24 | 0.08 | 13 |
| Ground Yellow Corn | 3.20 | 1.40 | 0.72 | — | 0.47 | 25.52 | 0.01 | 0.11 | 36 |
| Fish Meal | 8.09 | 1.11 | 0.09 | — | 1.50 | 0.55 | 0.65 | 0.44 | 13 |
| TOTAL | 19.81 | 4.00 | 6.20 | 4.62 | 10.06 | 43.33 | 1.49 | 0.82 | 94 |
| LAYER PELLETS or MASH | | | | | | | | | |
| Water Hyacinth Leaves | 4.68 | 0.80 | 4.28 | 2.83 | 3.40 | 9.15 | 0.52 | 0.14 | 25 |
| Water Hyacinth Roots | 0.59 | 0.03 | 0.40 | 0.56 | 1.35 | 2.08 | 0.05 | 0.03 | 5 |
| *HLPC | 3.02 | 0.65 | 0.56 | 1.01 | 2.80 | 5.20 | 0.24 | 0.08 | 13 |
| Ground Yellow Corn | 3.25 | 1.42 | 0.73 | — | 0.47 | 25.88 | 0.01 | 0.11 | 36.5 |
| Fish Meal | 8.09 | 1.11 | 0.09 | — | 1.50 | 0.55 | 0.65 | 0.44 | 13 |
| TOTAL | 19.63 | 4.01 | 6.06 | 4.40 | 9.52 | 42.86 | 1.47 | 0.80 | 92.5 |

*Hyacinth Leaf Protein Concentrate

| | TURKEYS FEED FOMULAE H. R. D. C. - Foreign | | |
|---|---|---|---|
| Feedstuff | Starter Pellets or Mash % | Grower Pellets or Mash % | Breeding Pellets or Mash % |
| Water Hyacinth Meal (Roots & Leaves | 32 | 32 | 30 |
| *HLPC | 13 | 13 | 13 |

-continued

TURKEYS FEED FOMULAE
H. R. D. C. - Foreign

| Feedstuff | Starter Pellets or Mash % | Grower Pellets or Mash % | Breeding Pellets or Mash % |
|---|---|---|---|
| Ground Yellow Corn | 12.5 | 36 | 36.5 |
| Soybean Oil Meal | 20 | — | — |
| Fish Meal | 17 | 13 | 13 |
| Salt | 0.5 | 0.5 | 0.5 |
| Bone Meal | 1.0 | 1.0 | 1.0 |
| Shell | 0.5 | 1.0 | 2.5 |
| Molasses | 3.5 | 3.5 | 3.5 |
| TOTAL | 100.0 | 100.0 | 100.0 |
| CALCULATED ANALYSIS (Total Percentage Value for each Feedstuff per Formula) | | | |
| Protein | 28.21% | 19.81% | 19.63% |
| Fat | 4.17 | 4.00 | 4.02 |
| Fiber | 5.67 | 6.20 | 6.06 |
| Moisture | 4.72 | 4.62 | 4.40 |
| Bureau OF ANIMAL INDUSTRY STANDARD VALUE (REPUBLIC OF THE PHILIPPINES) | | | |
| Protein NLT | 28% | 16% | 15% |
| Fat NLT | 4 | 4 | 4 |
| Fiber NMT | 8 | 10 | 10 |
| Moisture NMT | 13 | 13 | 13 |

*Hyacinth Leaf Protein Concentrate

TURKEYS FEED FORMULAE
H. R. D. C. - FOREIGN
Calculated Analysis for each Feedstuff per Formula (Reference Value)

| Feedstuff | Protein | Fat | Fiber | Moisture | Ash | NFE | Calcium | Phos. | % Comp. |
|---|---|---|---|---|---|---|---|---|---|
| STARTER PELLETS OR MASH | | | | | | | | | |
| Water Hyacinth Leaves | 2.43 | 0.42 | 2.22 | 1.47 | 1.77 | 4.76 | 0.27 | 0.07 | 13 |
| Water Hyacinth Roots | 2.24 | 0.10 | 1.50 | 2.13 | 5.13 | 7.90 | 0.19 | 0.13 | 19 |
| *HLPC | 3.02 | 0.65 | 0.56 | 1.12 | 2.80 | 5.20 | 0.24 | 0.08 | 13 |
| Ground Yellow Corn | 1.11 | 0.49 | 0.25 | — | 0.16 | 8.86 | — | 0.04 | 12.5 |
| Soybean Oil Meal | 8.84 | 1.06 | 1.02 | — | 1.16 | 5.86 | 0.06 | 0.14 | 20 |
| Fish Meal | 10.57 | 1.45 | 0.12 | — | 1.96 | 0.71 | 0.85 | 0.58 | 17 |
| TOTAL | 28.21 | 4.17 | 5.67 | 4.72 | 12.98 | 33.29 | 1.61 | 1.04 | 94.5 |
| GROWER PELLETS or MASH | | | | | | | | | |
| Water Hyacinth Leaves | 4.68 | 0.80 | 4.28 | 2.83 | 3.40 | 9.15 | 0.52 | 0.14 | 25 |
| Water Hyacinth Roots | 0.82 | 0.04 | 0.55 | 0.78 | 1.89 | 2.91 | 0.07 | 0.05 | 7 |
| *HLPC | 3.02 | 0.65 | 0.56 | 1.01 | 2.80 | 5.20 | 0.24 | 0.08 | 13 |
| Ground Yellow Corn | 3.20 | 1.40 | 0.72 | — | 0.47 | 25.52 | 0.01 | 0.11 | 36 |
| Fish Meal | 8.09 | 1.11 | 0.09 | — | 1.50 | 0.55 | 0.65 | 0.44 | 13 |
| TOTAL | 19.81 | 4.00 | 6.20 | 4.62 | 10.06 | 43.33 | 1.49 | 0.82 | 94 |
| BREEDING PELLETS or MASH | | | | | | | | | |
| Water Hyacinth Leaves | 4.68 | 0.80 | 4.28 | 2.83 | 3.40 | 9.15 | 0.52 | 0.14 | 25 |
| Water Hyacinth Roots | 0.59 | 0.03 | 0.40 | 0.56 | 1.35 | 2.08 | 0.05 | 0.03 | 5 |
| *HLPC | 3.02 | 0.65 | 0.56 | 1.01 | 2.80 | 5.20 | 0.24 | 0.08 | 13 |
| Ground Yellow Corn | 3.25 | 1.42 | 0.73 | — | 0.47 | 25.88 | 0.01 | 0.11 | 36.5 |
| Fish Meal | 8.09 | 1.11 | 0.09 | — | 1.50 | 0.55 | 0.65 | 0.44 | 13 |
| TOTAL | 19.63 | 4.01 | 6.06 | 4.40 | 9.52 | 42.86 | 1.47 | 0.80 | 92.5 |

*Hyacinth Leaf Protein Concentrate

SWINE FEED FORMULAE
H. R. D. C. - FOREIGN

| Feedstuff | Pre-starter Pellets or Mash % | Starter Pellets or Mash % | Growing pellets or Mash % | Breeding pellets or Mash % | Fattening Pellets or Mash % | Lactating Pellets or Mash % |
|---|---|---|---|---|---|---|
| Water Hyacinth Meal (Roots & Leaves) | 27 | 37 | 32 | 33.4 | 33.4 | 33.4 |
| *HLPC | 17.9 | 13.9 | 13 | 13 | 13 | 13 |
| Ground Yellow Corn | 33 | 32 | 37.9 | 36.5 | 36.5 | 36.5 |
| Fish Meal | 18 | 13 | 13 | 13 | 13 | 13 |
| Salt | 0.5 | 0.5 | 0.5 | 0.5 | 0.5 | 0.5 |
| Shell | 1.5 | 1.5 | 1.5 | 1.5 | 1.5 | 1.5 |
| Molasses | 2.0 | 2.0 | 2.0 | 2.0 | 2.0 | 2.0 |
| Zinc Carbonate | 0.1 | 0.1 | 0.1 | 0.1 | 0.1 | 0.1 |
| TOTAL | 100.0 | 100.0 | 100.0 | 100.0 | 100.0 | 100.0 |
| CALCULATED ANALYSIS (Total Percentage for each Feedstuff per Formula) | | | | | | |
| Protein | 22.44 | 20.63 | 19.99 | 20.03 | 20.03 | 20.03 |
| Fat | 4.16 | 4.06 | 4.08 | 4.03 | 4.03 | 4.03 |
| Fiber | 4.98 | 7.01 | 6.24 | 6.32 | 6.32 | 6.32 |
| Moisture | 4.58 | 5.25 | 4.62 | 4.78 | 4.78 | 4.78 |
| BUREAU OF ANIMAL INDUSTRY STANDARD VALUE (REPUBLIC OF THE PHILIPPINES) | | | | | | |
| Protein NLT | 22.0% | 18.0% | 16.0% | 15.0% | 12.0% | 15.0% |
| Fat NLT | 4.0 | 4.0 | 4.0 | 4.0 | 4.0 | 4.0 |
| Fiber NMT | 5.0 | 8.0 | 8.0 | 10.0 | 10.0 | 10.0 |
| Moisture NMT | 13.0 | 13.0 | 13.0 | 13.0 | 13.0 | 13.0 |

*HYACINTH LEAF PROTEIN CONCENTRATE

SWINE FEED FORMULAE
H.R.D.C. - FOREIGN
Calculated Analysis for each Feedstuff per Formula (Reference Value)

PRE-STARTER PELLETS OR MASH

| Feedstuff | Protein | Fat | Fiber | Moisture | Ash | MFE | Calcium | Phos. | % Comp. |
|---|---|---|---|---|---|---|---|---|---|
| Water Hyacinth Leaves | 2.62 | 0.45 | 2.39 | 1.58 | 1.90 | 5.12 | 0.29 | 0.08 | 14 |
| Water Hyacinth Roots | 1.53 | 0.07 | 1.03 | 1.46 | 3.51 | 5.41 | 0.13 | 0.09 | 13 |
| *HLPC | 4.15 | 0.90 | 0.77 | 1.54 | 3.85 | 7.16 | 0.33 | 0.11 | 17.9 |
| Ground Yellow Corn | 2.94 | 1.28 | 0.66 | — | 0.43 | 23.39 | 0.01 | 0.10 | 33 |
| Fish Meal | 11.20 | 1.46 | 0.13 | — | 2.07 | 0.79 | 0.90 | 0.61 | 18 |
| TOTAL | 22.44 | 4.16 | 4.98 | 4.58 | 11.76 | 41.87 | 1.66 | 0.99 | 95.9 |
| STARTER PELLETS OR MASH | | | | | | | | | |
| Water Hyacinth Leaves | 5.61 | 0.96 | 5.13 | 3.39 | 4.08 | 10.98 | 0.62 | 0.16 | 30 |
| Water Hyacinth Roots | 0.83 | 0.04 | 0.55 | 0.78 | 1.89 | 2.91 | 0.07 | 0.05 | 7 |
| *HLPC | 3.25 | 0.70 | 0.60 | 1.08 | 2.99 | 5.56 | 0.26 | 0.08 | 13.9 |
| Ground Yellow Corn | 2.85 | 1.25 | 0.64 | — | 0.42 | 22.69 | 0.01 | 0.10 | 32 |
| Fish Meal | 8.09 | 1.11 | 0.09 | — | 1.50 | 0.55 | 0.65 | 0.44 | 13 |
| TOTAL | 20.63 | 4.06 | 7.01 | 5.25 | 10.88 | 42.69 | 1.61 | 0.83 | 95.9 |
| GROWER PELLETS OR MASH | | | | | | | | | |
| Water Hyacinth Leaves | 4.68 | 0.80 | 4.28 | 2.83 | 3.40 | 9.15 | 0.52 | 0.14 | 25 |
| Water Hyacinth Roots | 0.83 | 0.04 | 0.55 | 0.78 | 1.89 | 2.91 | 0.07 | 0.05 | 7 |
| *HLPC | 3.02 | 0.65 | 0.56 | 1.01 | 2.80 | 5.20 | 0.24 | 0.08 | 13 |
| Ground Yellow Corn | 3.37 | 1.48 | 0.76 | — | 0.49 | 26.87 | 0.01 | 0.11 | 37.9 |
| Fish Meal | 8.09 | 1.11 | 0.09 | — | 1.50 | 0.55 | 0.65 | 0.44 | 13 |
| TOTAL | 19.99 | 4.08 | 6.24 | 4.62 | 10.08 | 44.68 | 1.49 | 0.82 | 95.9 |

*Hyacinth Leaf Protein Concentrate

SWINE FEED FORMULAE
H.R.D.C. - FOREIGN
Calculated Analysis for each Feedstuff per Formula (Reference Value)

BREEDING PELLETS OR MASH

| Feedstuff | Protein | Fat | Fiber | Moisture | Ash | NFE | Calcium | Phos. | % Comp. |
|---|---|---|---|---|---|---|---|---|---|
| Water Hyacinth Leaves | 4.68 | 0.80 | 4.28 | 2.83 | 3.40 | 9.15 | 0.52 | 0.14 | 25 |
| Water Hyacinth Roots | 0.99 | 0.04 | 0.66 | 0.94 | 2.27 | 3.49 | 0.09 | 0.06 | 8.4 |
| *HLPC | 3.02 | 0.65 | 0.56 | 1.01 | 2.80 | 5.20 | 0.24 | 0.08 | 13 |
| Ground Yellow Corn | 3.25 | 1.43 | 0.73 | — | 0.47 | 25.88 | 0.01 | 0.11 | 36.5 |
| Fish Meal | 8.09 | 1.11 | 0.09 | — | 1.50 | 0.55 | 0.65 | 0.44 | 13 |
| TOTAL | 20.03 | 4.03 | 6.32 | 4.78 | 10.44 | 44.27 | 1.51 | 0.83 | 95.9 |
| FATTENING PELLETS OR MASH | | | | | | | | | |
| Water Hyacinth Leaves | 4.68 | 0.80 | 4.28 | 2.83 | 3.40 | 9.15 | 0.52 | 0.14 | 25 |
| Water Hyacinth Roots | 0.99 | 0.04 | 0.66 | 0.94 | 2.27 | 3.49 | 0.09 | 0.06 | 8.4 |
| *HLPC | 3.02 | 0.65 | 0.56 | 1.01 | 2.80 | 5.20 | 0.24 | 0.08 | 13 |
| Ground Yellow Corn | 3.25 | 1.42 | 0.73 | — | 0.47 | 25.88 | 0.01 | 0.11 | 36.5 |
| Fish Meal | 8.09 | 1.11 | 0.09 | — | 1.50 | 0.55 | 0.65 | 0.44 | 13 |
| TOTAL | 20.03 | 4.03 | 6.32 | 4.78 | 10.44 | 44.27 | 1.51 | 0.83 | 95.9 |
| LACTATING PELLETS OR MASH | | | | | | | | | |
| Water Hyacinth Leaves | 4.68 | 0.80 | 4.28 | 2.83 | 3.40 | 9.15 | 0.52 | 0.14 | 25 |
| Water Hyacinth Roots | 0.99 | 0.04 | 0.66 | 0.94 | 2.27 | 3.49 | 0.09 | 0.06 | 8.4 |
| *HLPC | 3.02 | 0.65 | 0.56 | 1.01 | 2.80 | 5.20 | 0.24 | 0.08 | 13 |
| Ground Yellow Corn | 3.25 | 1.43 | 0.73 | — | 0.47 | 25.88 | 0.01 | 0.11 | 36.5 |
| Fish Meal | 8.09 | 1.11 | 0.09 | — | 1.50 | 0.55 | 0.65 | 0.44 | 13 |
| TOTAL | 20.03 | 4.03 | 6.32 | 4.78 | 10.44 | 44.27 | 1.51 | 0.83 | 95.9 |

*Hyacinth Leaf Protein Concentrate

FEED FORMULAE - H.R.D.C.
Cattle, Bufallo, Carabao and Horse Mash

| Feedstuffs | Starter Pellets or Mash % | Dairy Pellets or Mash % | Range Pellets or Mash % | Horse-All Age % |
|---|---|---|---|---|
| Corn | 25 | 25 | 23 | 23 |
| Soy Bean Oil Meal | 25 | 22 | 15 | 15 |
| Water Hyacinth (Roots & Leaves) | 20 | 36 | 43 | 43 |
| Water Hyacinth (Dehydrated Stolon) | 10 | — | — | — |
| Wheat Middling | 15 | 12 | 14 | 14 |
| Shell | 2.5 | 2.5 | 2.5 | 2.5 |
| Salt | 0.5 | 0.5 | 0.5 | 0.5 |
| Molasses | 2.0 | 2.0 | 2.0 | 2.0 |
| TOTAL | 100.0 | 100.0 | 100.0 | 100.0 |
| CALCULATED ANALYSIS (Total Percentage Value for each Feedstuff per Formula) | | | | |
| Protein | 20.06 | 19.62 | 17.86 | 17.86 |
| Fat | 3.90 | 3.81 | 3.68 | 3.68 |
| Fiber | 7.0 | 7.82 | 8.71 | 8.99 |
| BUREAU OF ANIMAL INDUSTRY STANDARD VALUE | | | | |
| Protein NLT | 20.0% | 18.0% | 16.0% | 16.0% |
| Fat NMT | 10.0 | 10.0 | 10.0 | 10.0 |
| Fiber NMT | 6.0 | 10.0 | 10.0 | 10.0 |
| NLT | 2.0 | 2.0 | 2.0 | 2.0 |

FEED FORMULAE - H.R.D.C.
Cattle, Buffalo, Carabao and Horse Mash
Calculated for each Feedstuff per Formula (Reference Value)

| STARTER MASH Feedstuff | Protein | Fat | Fiber | Moisture | Ash | NFE | Calcium | Phos. | % Comp. |
| --- | --- | --- | --- | --- | --- | --- | --- | --- | --- |
| Corn | 2.23 | 0.98 | 0.50 | — | 0.33 | 17.72 | 0.01 | 0.08 | 25 |
| Soy Bean Oil Meal | 11.05 | 1.33 | 1.40 | — | 1.45 | 7.32 | 0.08 | 0.18 | 25 |
| Water Hyacinth Leaves | 1.87 | 0.32 | 1.71 | 1.13 | 1.36 | 3.66 | 0.21 | 0.05 | 10 |
| Water Hyacinth Roots | 1.18 | 0.05 | 0.76 | 1.12 | 2.70 | 4.16 | 0.10 | 0.07 | 10 |
| Water Hyacinth Dehydrated Stolon | 1.18 | 0.05 | 0.69 | 1.12 | 2.70 | 4.16 | 0.10 | 0.07 | 10 |
| Wheat Middling | 2.55 | 1.17 | 1.91 | — | 0.63 | 8.97 | — | — | 15 |
| TOTAL | 20.06 | 3.90 | 7.00 | 3.37 | 9.17 | 45.99 | 0.50 | 0.45 | 95 |
| DAIRY MASH | | | | | | | | | |
| Corn | 2.23 | 0.98 | 0.50 | — | 0.33 | 17.72 | 0.01 | 0.08 | 25 |
| Soy Bean Oil Meal | 9.72 | 1.17 | 1.12 | — | 1.28 | 6.45 | 0.07 | 0.15 | 22 |
| Water Hyacinth Leaves | 3.74 | 0.64 | 3.42 | 2.26 | 2.72 | 7.32 | 0.41 | 0.11 | 20 |
| Water Hyacinth Roots | 1.89 | 0.08 | 1.26 | 1.79 | 4.32 | 6.66 | 0.16 | 0.11 | 16 |
| Wheat Middling | 2.04 | 0.94 | 1.52 | — | 0.50 | 7.18 | — | — | 12 |
| TOTAL | 19.62 | 3.81 | 7.82 | 4.05 | 9.15 | 45.33 | 0.65 | 0.45 | 95 |
| RANGE MASH and HORSE MASH (All Ages for Horse) | | | | | | | | | |
| Corn | 2.05 | 0.90 | 0.46 | — | 0.30 | 16.31 | — | 0.07 | 23 |
| Soy Bean Oil Meal | 6.63 | 0.80 | 0.77 | — | 0.87 | 4.40 | 0.05 | 0.11 | 15 |
| Water Hyacinth Leaves | 4.68 | 0.80 | 4.28 | 2.83 | 3.40 | 9.15 | 0.52 | 0.14 | 25 |
| Water Hyacinth Roots | 2.12 | 0.09 | 1.42 | 2.02 | 4.86 | 7.49 | 0.19 | 0.12 | 18 |
| Wheat Middling | 2.38 | 1.09 | 1.78 | — | 0.59 | 8.37 | — | — | 14 |
| TOTAL | 17.86 | 3.68 | 8.71 | 4.85 | 10.02 | 45.72 | 0.76 | 0.44 | 95 |

It should be understood that the percentage of the animal feed composition may still be modified without altering the true concept or essence of the present invention.

Having thus described fully the scope covered by the invention, I now claim:

1. An animal feed composition consisting essentially of water hyacinth meal derived from the leaves and roots which have been separated from the stems and hyacinth leaf protein concentrate, the water hyacinth meal and concentrate content of the composition being in a major amount and minor amounts of corn meal, fish meal, molasses, bone meal, shell and salt.

2. A feed composition for poultry comprising a mixture of 32-48% water hyacinth meal derived from the leaves and roots which have been separated from the stems, 5-13% hyacinth leaf protein concentrate, 12.0-36.5% corn meal, 10-17% fish meal, 3.5% molasses, 1.0% bone meal, 0.5-2.5% shell, and 0.5% salt, wherein the ingredients are based on percent by weight of the total composition.

3. A feed composition according to claim 2 including 18-22% soybean oil meal.

4. A feed composition for swine comprising a mixture of 27-56% water hyacinth meal derived from the leaves and roots which have been separated from the stems, 14-18% hyacinth leaf protein concentrate, 30-40% corn meal, 5-18% fish meal, 2.0% molasses, 0.5% salt, 1.5% shell and 0.1% zinc carbonate; wherein the ingredients are present in percent by weight of the total composition.

5. A feed composition for cattle, buffalo, carabao and horses comprising a mixture of 20-43% water hyacinth meal derived from the leaves and roots which have been separated from the stems, 10% water hyacinth dehydrated stolon, 23-25% corn meal, 15-25% soybean oil meal, 10-15% wheat middling, 2.5% shell, 2.0% molasses and 0.5% salt; wherein the ingredients are present in percent by weight of the total composition.

6. A method for producing a feed composition for poultry which comprises washing water hyacinth plants; separating the leaves and roots from the stems; drying the leaves and roots at a temperature not exceeding 120° C; grinding the dried materials to produce water hyacinth meal; and mixing thoroughly 32-48% of said water hyacinth meal, 5-13% hyacinth leaf protein concentrate, 12.0-36.5% corn meal, 10-17% fish meal, 3.5% molasses, 1.0% bone meal, 0.5-2.5% shell, and 0.5% salt, wherein the ingredients are based on percent by weight of the total composition.

7. A method according to claim 6 comprising passing the ground, dried materials through an 80-100 mesh screen, and wherein the mixture is pelletized.

8. A method for producing a feed composition for swine which comprises washing water hyacinth plants; separating the leaves and roots from the stems; drying the leaves and roots at a temperature not exceeding 120° C; grinding the dried materials to produce water hyacinth meal; mixing thoroughly 27-56% of said water hyacinth meal, 14-18% hyacinth leaf protein concentrate, 30-40% corn meal, 5-18% fish meal, 2.0% molasses, 0.5% salt, 1.5% shell and 0.1% zinc carbonate; wherein the ingredients are present in percent by weight of the total composition.

9. A method according to claim 8 comprising passing the ground, dried materials through an 80-100 mesh screen, and wherein the mixture is pelletized.

10. A method for producing a feed composition for cattle, buffalo, carabao and horses which comprises washing water hyacinth plants; separating the leaves and roots from the stems; drying the leaves and roots at a temperature not exceeding 120° C; grinding the dried materials to produce water hyacinth meal; mixing thoroughly 20-43% of said water hyacinth meal, 10% water hyacinth dehydrated stolon, 23-25% corn meal, 15-25% soybean oil meal, 10-15% wheat middling, 2.5% shell, 2.0% molasses and 0.5% salt; wherein the ingredients are present in percent by weight of the total composition.

11. A method according to claim 10 comprising passing the ground, dried materials through an 80-100 mesh screen, and wherein the mixture is pelletized.

* * * * *